(12) United States Patent
Xin et al.

(10) Patent No.: US 8,146,625 B2
(45) Date of Patent: Apr. 3, 2012

(54) FAIL-SAFE METHOD AND APPARATUS FOR ASPIRATING AND/OR DISPENSING LIQUIDS IN AUTOMATED LABORATORY INSTRUMENTS

(75) Inventors: Rongchang Xin, Palmetto Bay, FL (US); Eric M. Grace, Cooper City, FL (US); William W. Li, Miami, FL (US); Santos Vargas, Miami Lakes, FL (US)

(73) Assignee: Beckman Coulter, Inc., Brea, CA (US)

( * ) Notice: Subject to any disclaimer, the term of this patent is extended or adjusted under 35 U.S.C. 154(b) by 1080 days.

(21) Appl. No.: 12/033,254

(22) Filed: Feb. 19, 2008

(65) Prior Publication Data

US 2009/0206176 A1 Aug. 20, 2009

(51) Int. Cl.
*G01F 23/30* (2006.01)
*B65B 3/04* (2006.01)

(52) U.S. Cl. .............. 141/95; 141/7; 141/372; 141/374; 141/386; 422/106; 73/291; 73/306

(58) Field of Classification Search .................. 141/5, 7, 141/95, 363, 372, 374, 386; 422/105–106; 73/291, 305–308
See application file for complete search history.

(56) References Cited

U.S. PATENT DOCUMENTS

| | | | |
|---|---|---|---|
| 4,356,729 A * | 11/1982 | Kubota et al. | 73/308 |
| 4,626,700 A * | 12/1986 | Tanaka et al. | 307/118 |
| 4,714,176 A * | 12/1987 | Wijnen | 222/51 |
| 5,085,354 A | 2/1992 | Sogliani et al. | |
| 5,501,253 A * | 3/1996 | Weiss | 141/40 |
| 5,860,459 A * | 1/1999 | Reed et al. | 141/198 |
| 5,875,921 A | 3/1999 | Osgar et al. | |
| 6,195,013 B1 * | 2/2001 | Robinson | 340/623 |
| 6,513,378 B1 | 2/2003 | Love, Jr. | |
| 7,275,430 B2 | 10/2007 | Zuleta et al. | |
| 7,284,453 B2 * | 10/2007 | Li et al. | 73/863.01 |
| 7,546,936 B2 * | 6/2009 | Xin et al. | 222/464.3 |
| 2006/0127281 A1 | 6/2006 | Bjornson et al. | |
| 2007/0079653 A1 * | 4/2007 | Zuleta et al. | 73/304 R |

* cited by examiner

*Primary Examiner* — Gregory Huson
*Assistant Examiner* — Nicolas A Arnett
(74) *Attorney, Agent, or Firm* — K&L Gates LLP; Louis C. Cullman; Thomas A. Turano (57) ABSTRACT

A method for preventing either the introduction of air into a liquid aspirated from a container through an aspiration line passing through a container cap, or the over-filling or non-filling of a container by a liquid dispensed through a dispensing line passing through a container cap. Such method comprises the steps of simultaneously detecting that (a) the container cap is properly positioned on and secured to a liquid container from which liquid is to be aspirated, or into which a liquid is to be dispensed, and (b) detecting that the level of liquid in the container is either above or below a predetermined level.

8 Claims, 6 Drawing Sheets

FAIL-SAFE METHOD AND APPARATUS FOR ASPIRATING AND/OR DISPENSING LIQUIDS IN AUTOMATED LABORATORY INSTRUMENTS

BACKGROUND OF THE INVENTION

1. Field of the Invention

The present invention relates to improvements in automated methods and apparatus for aspirating liquids from containers, and/or for dispensing liquids into containers. More particularly, this invention is directed to improvements in methods and apparatus for minimizing (a) the inadvertent introduction of air into an aspirated liquid, and/or (b) the overfilling or non-filling of a container by a dispensed liquid.

2. The Prior Art

In automated analytical laboratory instruments, it is common to selectively mix together various reagents and sample materials in a mixing chamber in order to study, for example, the effects of such reagents on the sample material. Typically, in automated, high-throughput, instruments designed to repetitively perform various tests on a multitude of samples presented to it, the reagents (including sample diluents) are contained in relatively large containers or reservoirs that are stowed within, or adjacent to, the instrument housing. Such containers usually carry a cap through which a liquid-aspiration line or conduit passes that serves to gain access to the contained liquid. A syringe pump or the like operates to transfer a predetermined (relatively small) volume of the contained liquid to a desired location (e.g., the inlet of a mixing chamber) within the instrument. To avoid the aspiration of any air from the liquid container during the liquid aspirating process, it is essential, of course, that the free or distal end of the aspiration line be maintained below the level of liquid in the container. Any air introduced into the aspirated liquid will lead to erroneous test results since it compromises the provision of prescribed volumes of liquid required for a given test. Thus, to assure that the end of the aspiration line is safely below the liquid level in the container, it is common for the container cap to support a float switch or some other liquid level-sensor that serves to activate an alarm when the liquid level drops below a preset minimum value within the container, typically when the distal end of the aspiration line is just below a safe level. When an alarm occurs, the instrument operator must replace the nearly empty container with a fresh container of liquid and then attach the aspiration line-supporting and level-sensing cap to the new container.

In instruments of the above noted type, it is also common to dispense the liquid waste products from all the tests conducted within the instrument into a relatively large waste container located within or near the instrument housing. Here again, the cap of such container commonly supports a conduit or dispense line through which the waste liquid can enter the container. To assure the container is not overfilled, which could result in contaminating the laboratory area with a bio-hazardous liquid, the waste container cap also supports a float switch or the like that activates an alarm when the liquid waste level exceeds a predetermined safe level. When such an alarm occurs, the instrument operator will remove the nearly full waste container and replace it with an empty container, being certain to attach the dispense line and level-sensing cap.

In liquid aspirating and dispensing systems of the type described, there is always a possibility that the instrument operator, in changing reagent or waste containers, will not properly attach, or even forget to attach, the aforementioned aspiration/dispensing cap to the top of the new container. Note, when changing containers, the caps can be set down in an orientation in which the float switches which, upon being removed from the liquid, are free to assume either an OPEN or CLOSED state, will mistakenly indicate to the instrument logic that the liquid level is within a safe limit. When the caps are not properly attached to their intended container, air can enter the aspiration line, or waste liquid can leak from the waste container or even be dispensed outside the container.

SUMMARY OF THE INVENTION

In view of the foregoing discussion, an object of this invention is to provide a fail-safe method and apparatus for aspirating and dispensing liquids from and to a container, whereby the above-noted air-introduction and leakage problems cannot occur.

By virtue of the present invention, the aspiration (and dispensing) of a liquid from (and to) a container can only occur when the container cap through which such aspiration (and dispensing) takes place is securely attached to the mouth of the container, and the level of liquid in the container is at an appropriate level. Thus, according to a first aspect of the invention, there is provided an improved apparatus for preventing either the introduction of air into a liquid aspirated from a container through an aspiration line passing through a container cap, or the over-filling or non-filling of a container by a liquid dispensed through a dispensing line passing through a container cap. Such apparatus comprises a pair of detectors, one operating to detect that such container cap is properly positioned on and secured to a liquid container from which liquid is to be aspirated, or into which a liquid is to be dispensed, and the other detector operating to detect that the level of liquid in the container is either above a predetermined level (in the case of liquid aspiration) or below a preset level (in the case of liquid dispensing). A system controller operates to enable aspiration or dispensing of liquid only in the event both of these detectors sense the presence of proper cap attachment and a safe liquid level within the container.

According to a second aspect of this invention, an improved method is provided for preventing either the introduction of air into a liquid aspirated from a container through an aspiration line passing through a container cap, or the over-filling or non-filling of a container by a liquid dispensed through a dispensing line passing through a container cap. Such method comprises the steps of simultaneously detecting that (a) the container cap is properly positioned on and secured to a liquid container from which liquid is to be aspirated, or into which a liquid is to be dispensed, and (b) detecting that the level of liquid in the container is either above or below a predetermined level; and enabling liquid aspiration or dispensing only when conditions (a) and (b) are detected.

The invention and its various aspects and advantages will be better understood from the ensuing detailed description of preferred embodiments, reference being made to the accompanying drawings in which like reference characters denote like parts or components.

BRIEF DESCRIPTION OF THE DRAWINGS

FIG. 2 is both a cross-sectional illustration of the apparatus shown in FIG. 1, and a schematic illustration of;

DETAILED DESCRIPTION OF PREFERRED EMBODIMENTS

Figure 1:
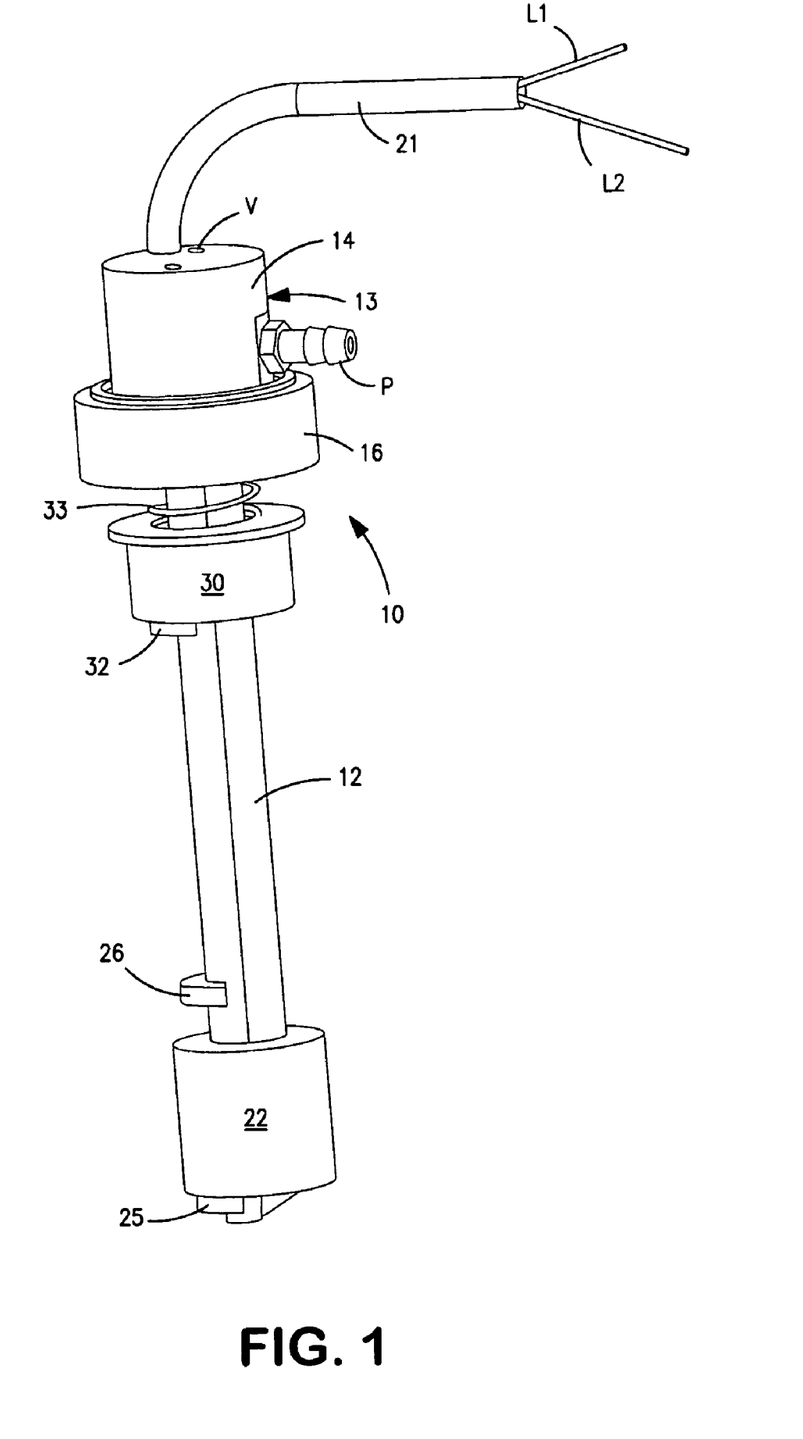
FIG. 1 is an isometric illustration of apparatus embodying the present invention.

Referring now to the drawings, FIG. 1 illustrates a preferred embodiment of the invention that is adaptable to both aspirate a liquid from a container C (shown in FIG. 3), and to dispense a liquid to such container through a port P. To simplify this description, the apparatus will be initially described as it is used to aspirate liquid from a container. Later, the use of such apparatus as a liquid dispenser will be described.

Figure 2:
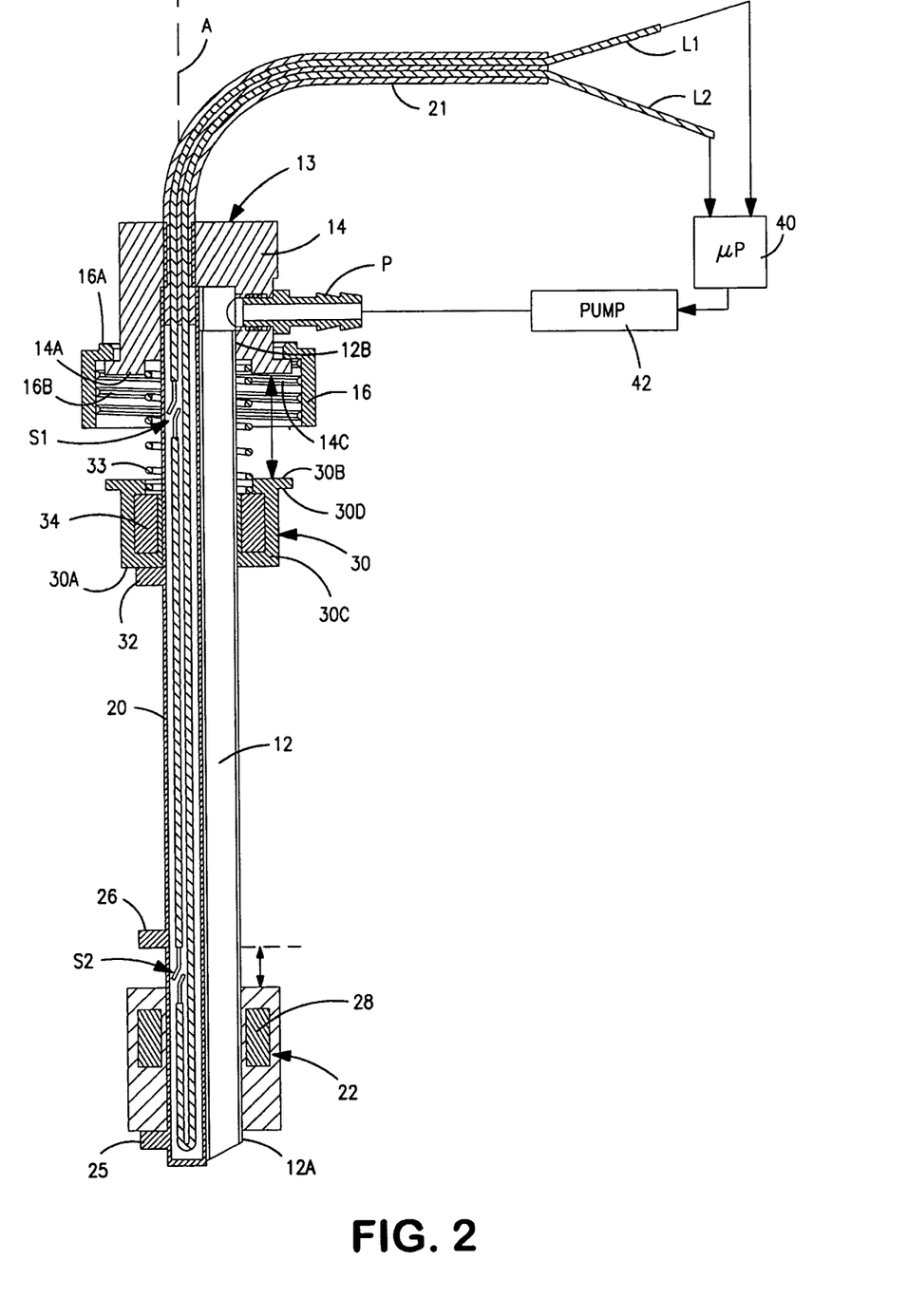
Figure 3:
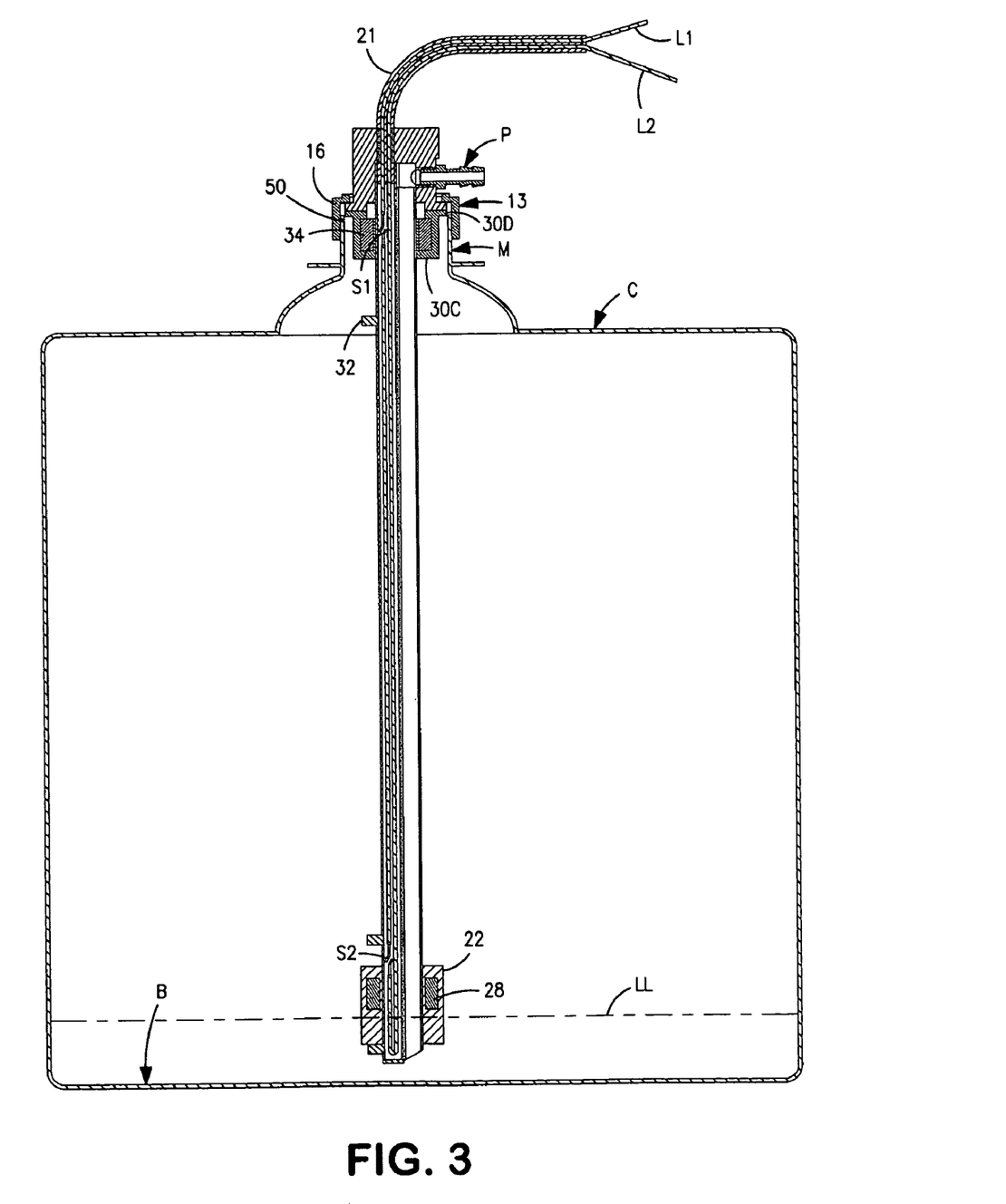
FIG. 3 is a cross-sectional illustration of the apparatus of FIG. 1 when attached to a nearly empty container of liquid.

The liquid-aspirating apparatus 10 of FIG. 1 comprises an elongated and hollow aspiration tube 12 having a distal end 12A and a proximal end 12B (see FIG. 2). The latter is in fluid communication with port P via a container-attachment assembly 13 which rigidly supports both the proximal end of the aspiration tube 12 and port P. As its name implies, the container-attachment assembly 13 serves to releasably attach the liquid aspiration apparatus to the mouth of a container of liquid. When apparatus 10 is used to aspirate liquid from a container, as shown in FIG. 3, the length of the aspiration tube is such that the distal end thereof is positioned at or closely spaced from the container bottom B. The container-attachment assembly comprises a cylindrically-shaped housing 14 that rotatably supports, at its base, a threaded cylindrical collar 16, the latter being supported for rotation about the central axis A of housing 14. Such rotational support is provided by the combination of a circular ring 14A extending outwardly from the base of housing 14, and an inwardly-extending circular flange 16A formed at the top of collar 16. The threaded inside surface 16B of collar 16 is structured to threadingly engage a complimentary threaded surface surrounding the mouth M of container C as the collar rotates about axis A. In attaching the liquid-aspirating apparatus to the mouth of container C, ring 14A and flange 16A are compressed into sliding engagement.

Figure 4A:
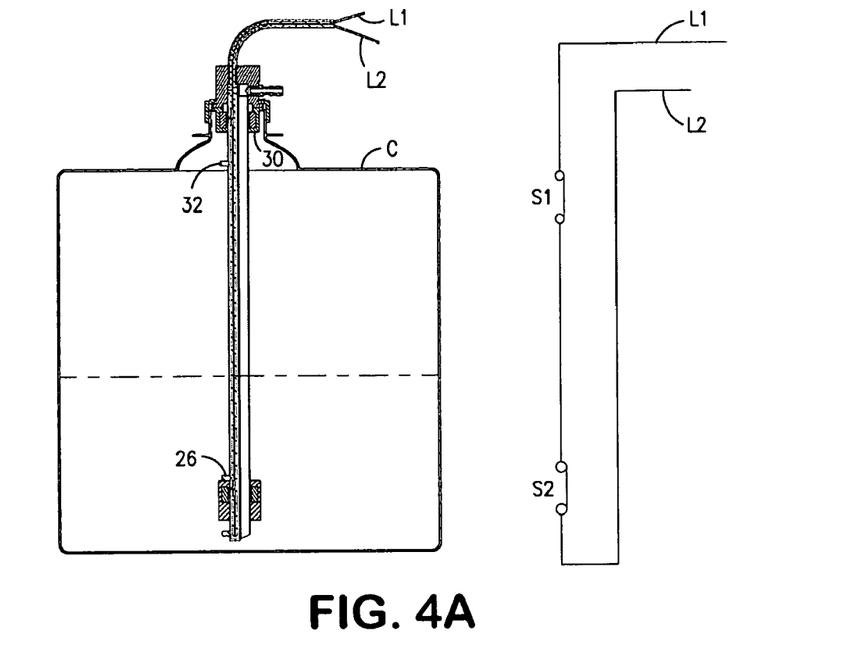
FIGS. 4A and 4B illustrate the apparatus of the invention when used in a liquid aspiration mode.
Figure 4B:
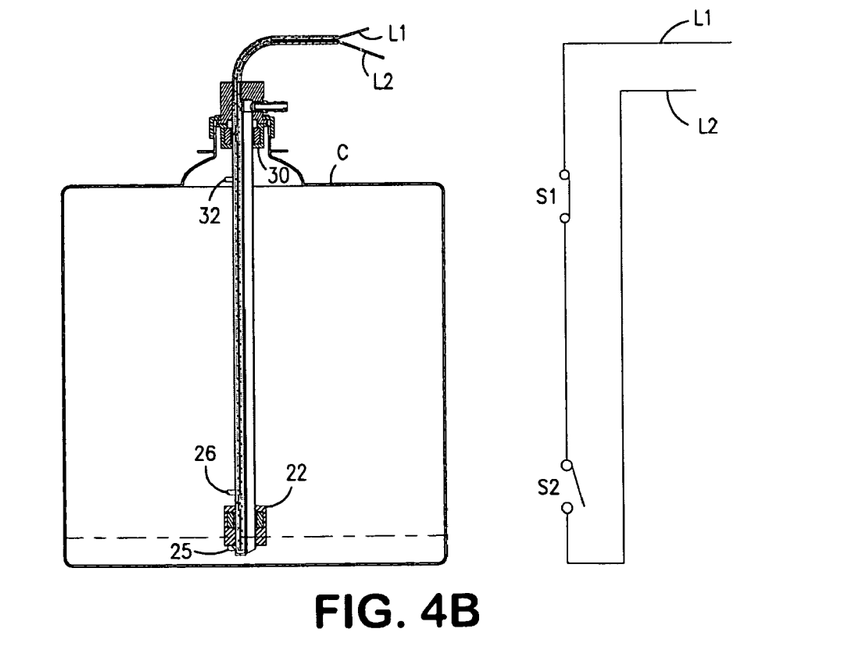

In addition to supporting the aspiration tube 12, housing 14 also rigidly supports an elongated electrical conduit 20 that contains a cable 21 comprising a pair of electrical leads L1 and L2. As indicated in FIGS. 4A and 4B, leads L1 and L2 define a wire loop circuit LC that extends along a substantial portion of the conduit. (See FIG. 2). Connected in series, as shown in this circuit, is a pair of magnetic proximity switches S1 and S2. Preferably, conduit 20 is cylindrical in shape, and it extends parallel to tube 12, in close proximity therewith. A float member 22 surrounds the tube/conduit combination and is mounted for sliding movement over the outer surfaces of the tube/conduit combination. Such sliding movement is limited by a pair of stops 25, 26, preferably formed on the exterior surface of conduit 20. As the float member slides from a position in which its bottom surface contacts from stops 25 to a position in which its top surface contacts stop 26, a magnetic member 28 embedded in the float member causes switch S2 to change its state (here, from OPEN to CLOSED). Sliding of float member 22 upwardly (from stop 25 to 26) results when the float is immersed in liquid and the buoyant force of the liquid on the float exceeds the gravitational force on the float member, and sliding of the float member downwardly results under the converse conditions, i.e., when the gravitational force exceeds the buoyant force of the liquid.

Similar to the manner in which the tube/conduit combination slidable supports float member 22, it also slidably supports a piston member 30 that comprises a magnetic proximity switch S1. Piston member 30, which contains a magnetic switch-actuating member 34, is movable between a first position in which the bottom surface 30A of piston member 30 abuts a stop 32 formed on the outer surface of conduit 20, and a second position in which its top surface 30B contacts the bottom surface 14C of housing 14. In moving from its first to seconded position, the piston member operates to change the state of the magnetic switch S1 from OPEN to CLOSED. A coil spring 33 (or the like) surrounding the tube/conduit combination and positioned between surfaces 14C and 30B, serves to spring bias the piston member downward, into engagement with stop 32, thereby rendering the state of switch S1 NORMALLY OPEN. Sliding movement of piston 30 against the bias force of spring 33 is achieved when the aspiration tube is inserted through the mouth of container C, as explained below.

Referring to FIG. 3, piston member 30 is shown as comprising a lower cylindrical portion 30C having a diameter that enables such portion to pass through the circular rim 50 of the container mouth, and a concentric upper circular flange 30D of greater diameter which prevents it from passing through the container rim. Thus, as the aspiration tube is inserted into the container and downward pressure is manually applied, piston 30 is driven upwardly by the engagement between the container rim 50 and flange 30D. Continued movement of the apparatus into the container enables the threaded collar 16 to engage the threaded surface surrounding the container mouth, and rotation of the collar draws the piston member 30 further upwardly until the collar is secured to the container mouth. At this time, the magnetic member 34 embedded in the piston member will be positioned to change the conductive state of magnetic switch S1 (i.e., changing from OPEN, as shown in FIG. 2, to CLOSED, as shown in FIG. 3). Thus, the state of switch S1 will always indicate whether or not the apparatus is properly attached to a container, and the state of switch S2 will indicate whether or not the liquid level LL in the container is at a safe level for aspiration.

Referring to FIG. 4A, the liquid level LL in container C is shown to be ample to raise the float member 22 into engagement with stop 26, at which time switch S2 is caused to operate in a CLOSED state, as shown in the circuit diagram. Meanwhile, switch S1 is CLOSED by virtue of the apparatus being properly attached to the container mouth. Only in the event that both switches are CLOSED will the instrument's microprocessor 40 enable pump 42 to aspirate liquid from the container. Under all other conditions, the aspiration pump 42 remains disabled.

In FIG. 4B, the liquid level LL is shown to have dropped to a lower level in which the float member is no longer buoyed up by the liquid and the bottom of the float member 22 is now dropped into contact with stop 25. At this time, the magnetic member 28 within the float no longer functions to close switch S2, and the latter operates in its OPEN state. This condition, i.e., S1 CLOSED and S2 OPEN, is transmitted to the instruments microprocessor 40, which then disables pump 42 and thereby prevents aspiration. Whenever the container C requires replacement, e.g., to provide a fresh supply liquid, the operator will unscrew the cap assembly 13 and withdraw the aspiration tube from the container. During this time period, spring 33 will urge piston 30 back into engagement with stop 32, thereby removing the magnetic member 34 from the vicinity of the previously CLOSED switch S1, thereby allowing switch S1 to return to its normally OPEN state. Note, unlike the float switch S2 in which the moving element is allowed to move freely along the aspiration tube/conduit combination, the moving element of the proximity switch S1 (piston 30) must be biased towards a direction in which the switch state will be OPEN whenever the cap is removed from the container. Otherwise, both switches could be inadvertently moved to a CLOSED state, enabling the pump to draw air into the aspiration line. The consequences are much more sever in the case the apparatus of the invention is used in a dispense mode, as described below.

Figure 5A:
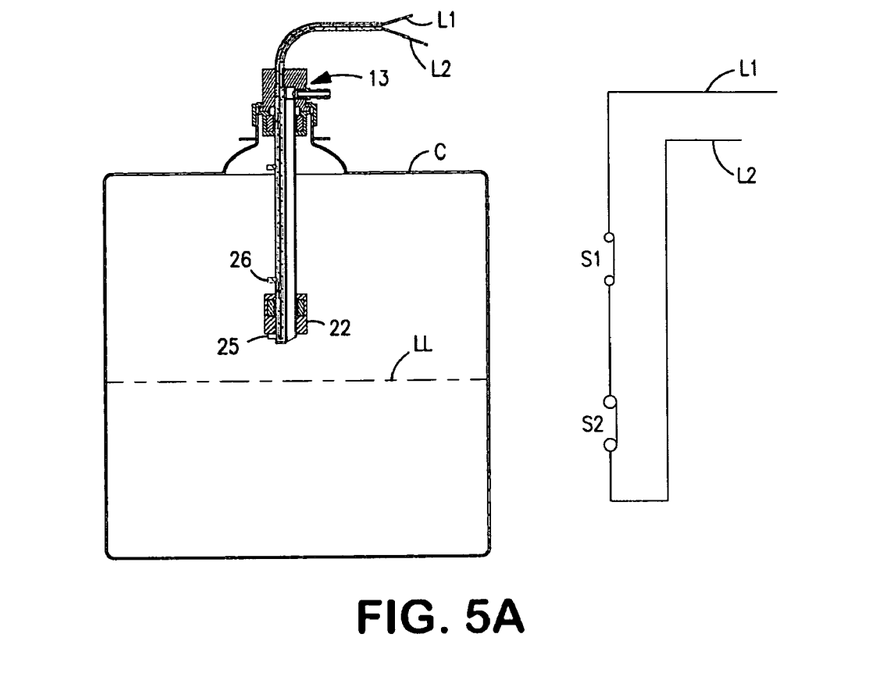
FIGS. 5A and 5B illustrate the apparatus of the invention when used in a liquid dispensing mode.
Figure 5B:
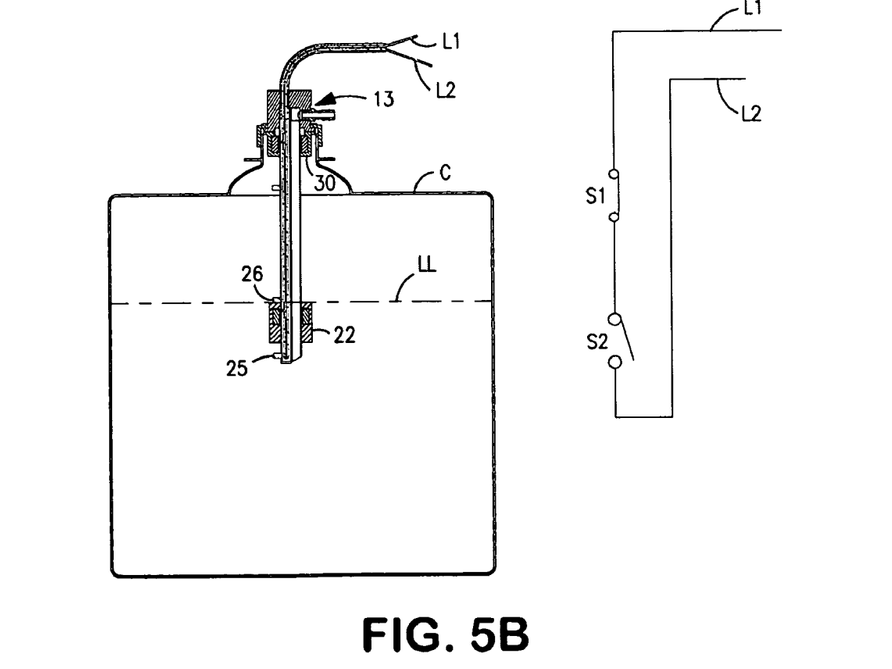

In a dispense mode, as illustrated in FIGS. 5A and 5B, the length of the tube 12/conduit 20 combination is considerably shorter than that of the combination in the aspiration mode, the object being, of course, to substantially fill the container C with liquid rather than to substantially empty it. In the dispense mode, the magnetic member 28 of the float switch is positioned within the float member to CLOSE the float switch S2 when the float is resting on stop 25, as it will be when the liquid level is below a safe level. Thus, as liquid is dispensed into the container through the distal end of tube 12, the liquid level will rise from the bottom of the container until the buoyant force of the liquid urges the top of float member 22 into contact with the upper stop 26. At this time, the magnetic member 28 within float 22 moves away from its switch-closing position to enable switch S2 to OPEN, as shown in FIG. 5B. At this time, the instrument microprocessor 40 will disable the (dispense) pump 42. As the container cap is unscrewed from the container and the dispense tube 12 is withdrawn, e.g., for the purpose of changing containers, the float member 22 will, under the force of gravity, immediately slide back to its switch-closing position in which the bottom of float member 22 again contacts stop 25 (as shown in FIG. 5A); however, as the container cap is removed, piston 30 is, under the influence of spring 33, immediately returned to its switch-opening position in which the bottom surface 30A of the piston member will abut stop 32. Thus, any liquid dispensing will be prevented until both switches are again closed, as occurs when the liquid-dispensing cap is properly screwed onto to an empty (or partially empty) container, thereby overcoming the bias force of spring 33 (tending toward opening the proximity switch S2), and the float member is resting on stop 25, indicating a liquid-accepting condition.

Technical advantages resulting from the aforedescribed apparatus include: (a) a liquid-aspirating/dispensing instrument cannot operate when either the liquid level in the container is unsafe, or the aspirating/dispensing assembly is not properly secured to a container; (b) by integrating two switches into a single sensing circuit, only one sensing resource is needed on the microprocessor board; and (c) if the electrical connection with the microprocessor is lost, the instrument will stop aspirating/dispensing liquid.

Figure 6A:
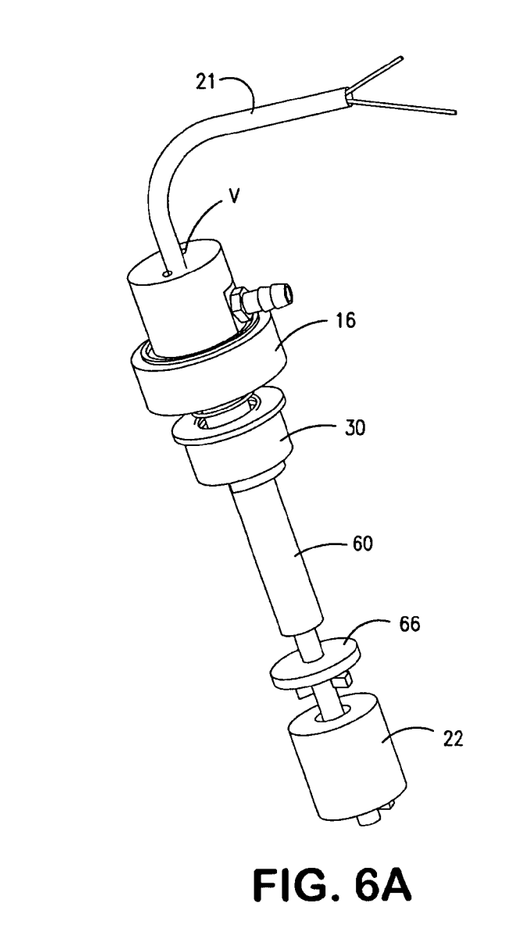
FIGS. 6A and 6B are perspective and cross-sectional illustrations of another embodiment of the invention.
Figure 6B:
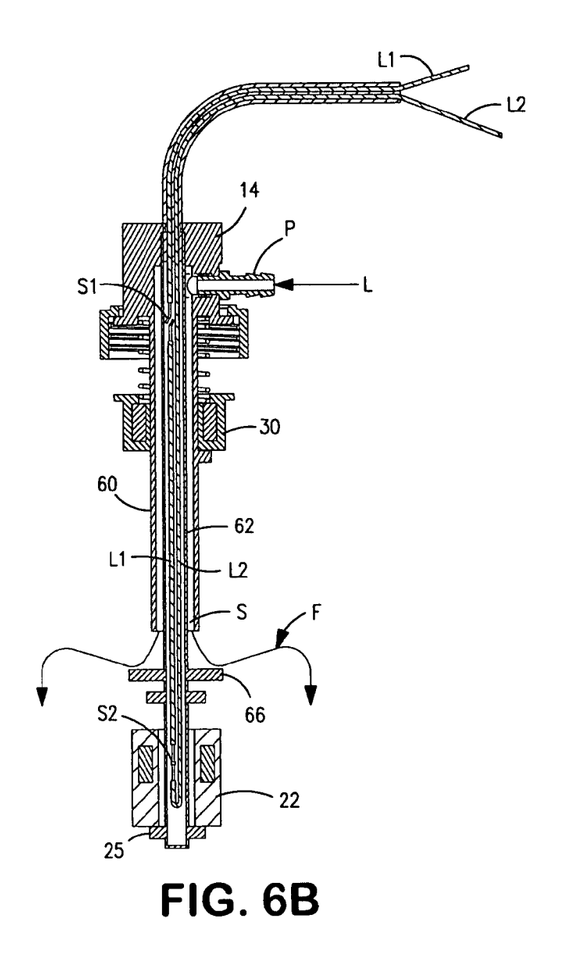

In many applications, the dispensing of waste liquid results in the formation of a liquid foam that occupies a significant space inside the container. As waste liquid is continually added to the container and the foam begins to accumulate, the foam may eventually escape from the container through a vent hole V formed in housing 14 of the liquid-dispensing assembly to prevent any pressure build-up in the container. To avoid this potential biohazard condition, it is preferred that the liquid dispensing apparatus described above be modified as follows: Referring to FIGS. 6A and 6B, housing 14 is shown as supporting a liquid-dispensing tube 60 through which liquid L, entering port P is dispensed, and within which a rigid electrical conduit 62 containing the afore-described magnetic switching circuit is contained. Like tube 60, conduit 62 is cylindrical in shape and concentrically arranged on the longitudinal axis of the tube. A space S is provided between the inside of tube 60 and the outside of conduit 62, such space providing annular passage for liquid L to enter the container from the dispensing tube. Axially spaced from the distal end 60A of tube 60 (e.g., by about 14 mm.) is a deflector plate 66, e.g. a disk, carried by conduit 62. Plate 66 is positioned to deflect the incoming dispensed liquid so as to form a fountain of liquid that spreads laterally outwardly and then downwardly towards the container bottom. This fountain-like flow has the effect of suppressing the formation (and breaking up) of any foam that might otherwise form atop the dispensed liquid. Thus, this altered apparatus has the effect of substantially reducing any tendency for the dispensed liquid to create a liquid-foam atop the liquid surface within the container that can escape the container through the vent hole V. This apparatus operates precisely as described above to avoid overfilling (or non-filling) of the container when assembly 13 is not properly attached to the container mouth, or when an excess amount of liquid is dispensed into the container.

The invention has been described with reference to certain preferred embodiments. Clearly, variations can be made without departing from the spirit of the invention, and such variations are intended to fall within the scope of the appended claims.

What is claimed is:

1. An apparatus for preventing either the introduction of air into a liquid aspirated from a container through an aspiration tube passing through a container cap, or the over-filling or no-filling of a container by a liquid dispensed through a dispensing tube passing through a container cap, said apparatus comprising a pair of detectors, one operating to detect that such container cap is properly positioned on and secured to a liquid container from which liquid is to be aspirated, or into which a liquid is to be dispensed, and the other detector operating to detect that the level of liquid in the container is either above or below a predetermined level, wherein said one detector comprises a proximity switch mounted in said container cap for sensing the proximity between said cap and a mouth of a container to which said cap is to be attached, and said other detector comprises a float switch, and wherein said proximity switch comprises a switch-actuating member that is slidably-mounted on either of said aspiration or dispensing tubes for movement between first and second axially-spaced positions, and a spring for urging said switch-actuating member towards a switch-opening position.

2. The apparatus as defined by claim 1 wherein said float switch comprises a switch-actuating float member that is slidably-mounted on either of said aspiration or dispensing tubes for movement between first and second axially-spaced positions.

3. The apparatus as defined by claim 2 wherein said both of switches are magnetic switches.

4. The apparatus as defined by claim 1 wherein said switch-actuating member is movable away from its normal switch-opening position as said cap is connected to said container.

5. The apparatus as defined by claim 1 wherein said switches are connected in series.

6. The apparatus as defined by claim 1 wherein said apparatus further comprises a deflector plate for deflecting and dispersing liquid dispensed into said container to reduce the formation of any liquid foam that may accumulate atop a volume of liquid dispensed into said container.

7. A method for preventing either the introduction of air into a liquid aspirated from a container through an aspiration line passing through a container cap, or the over-filling or non-filling of a container by a liquid dispensed through a dispensing line passing through a container cap, said method comprising the steps of simultaneously detecting, using a first detector, that (a) the container cap is properly positioned on and secured to a liquid container from which liquid is to be aspirated, or into which a liquid is to be dispensed, and (b) detecting, using a second detector, that the level of liquid in the container is either above or below a predetermined level, wherein said first detector comprises a proximity switch mounted in said container cap for sensing the proximity between said cap and a mouth of a container to which said cap is to be attached, and said second detector comprises a float switch, and wherein said proximity switch comprises a switch-actuating member that is slidably-mounted on either of said aspiration or dispensing tubes for movement between first and second axially-spaced positions, and a spring for urging said switch-actuating member towards a switch-opening position.

8. The method as defined by claim 7 further comprising the step of deflecting and dispersing liquid dispensed into said container to reduce the formation of any liquid foam that may accumulate atop a volume of liquid dispensed into said container.

\* \* \* \* \*